(12) United States Patent
Waggle et al.

(10) Patent No.: US 8,613,574 B2
(45) Date of Patent: Dec. 24, 2013

(54) HELICAL MILLING CUTTER

(75) Inventors: James M. Waggle, Derry, PA (US); Kevin M. Gamble, Stahlstown, PA (US); Ruy Frota de Souza Filho, Latrobe, PA (US); Karen A. Craig, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 1286 days.

(21) Appl. No.: 12/035,461

(22) Filed: Feb. 22, 2008

(65) Prior Publication Data
US 2009/0214304 A1  Aug. 27, 2009

(51) Int. Cl.
*B26D 3/11* (2006.01)

(52) U.S. Cl.
USPC .............................................. 407/59; 407/61

(58) Field of Classification Search
USPC ..................... 407/34, 58, 59, 61, 63; 144/221
See application file for complete search history.

(56) References Cited

U.S. PATENT DOCUMENTS

| | | | |
|---|---|---|---|
| 4,182,587 A * | 1/1980 | Striegl ........................... | 407/113 |
| 4,648,755 A * | 3/1987 | Stashko ........................... | 407/36 |
| 4,844,666 A * | 7/1989 | Tsujimura et al. ............... | 407/34 |
| 5,083,887 A * | 1/1992 | Dotany ........................... | 407/59 |
| 5,762,452 A * | 6/1998 | Mina ............................... | 407/34 |
| 5,913,644 A * | 6/1999 | DeRoche et al. ............... | 407/42 |
| 6,619,891 B2 * | 9/2003 | Hansson et al. ................ | 407/35 |
| 6,976,811 B1 * | 12/2005 | DeRoche et al. ............... | 407/56 |
| 7,134,811 B2 | 11/2006 | Francis et al. | |
| 7,399,146 B2 * | 7/2008 | Long et al. ....................... | 407/33 |
| 7,625,156 B2 * | 12/2009 | Pantzar ........................... | 407/34 |
| 2005/0084341 A1 | 4/2005 | Long, II et al. | |

FOREIGN PATENT DOCUMENTS

| | | | |
|---|---|---|---|
| DE | 274995 | * | 1/1990 |
| JP | 61199314 | | 12/1986 |
| JP | 63093511 A | | 4/1988 |
| JP | 04183512 A | | 6/1992 |
| JP | 10008211 A | | 1/1998 |

* cited by examiner

*Primary Examiner* — Kenneth E. Peterson
*Assistant Examiner* — Jennifer Swinney
(74) *Attorney, Agent, or Firm* — Larry R. Meenan, Esq.

(57) ABSTRACT

A cutting tool having an outer surface with a plurality of inserts connected to a distinct pocket extending generally radially on the outer surface. The cutting inserts are arranged in a helical array on the outer surface in a manner that at least one cutting edge of each cutting insert is spaced in an angular circumferential direction from the pocket of the next adjacent cutting insert. The spacing of the inserts is such that a distinct point on the each one of the one or more cutting edges define part of a layout line having a non-uniform slope.

10 Claims, 5 Drawing Sheets

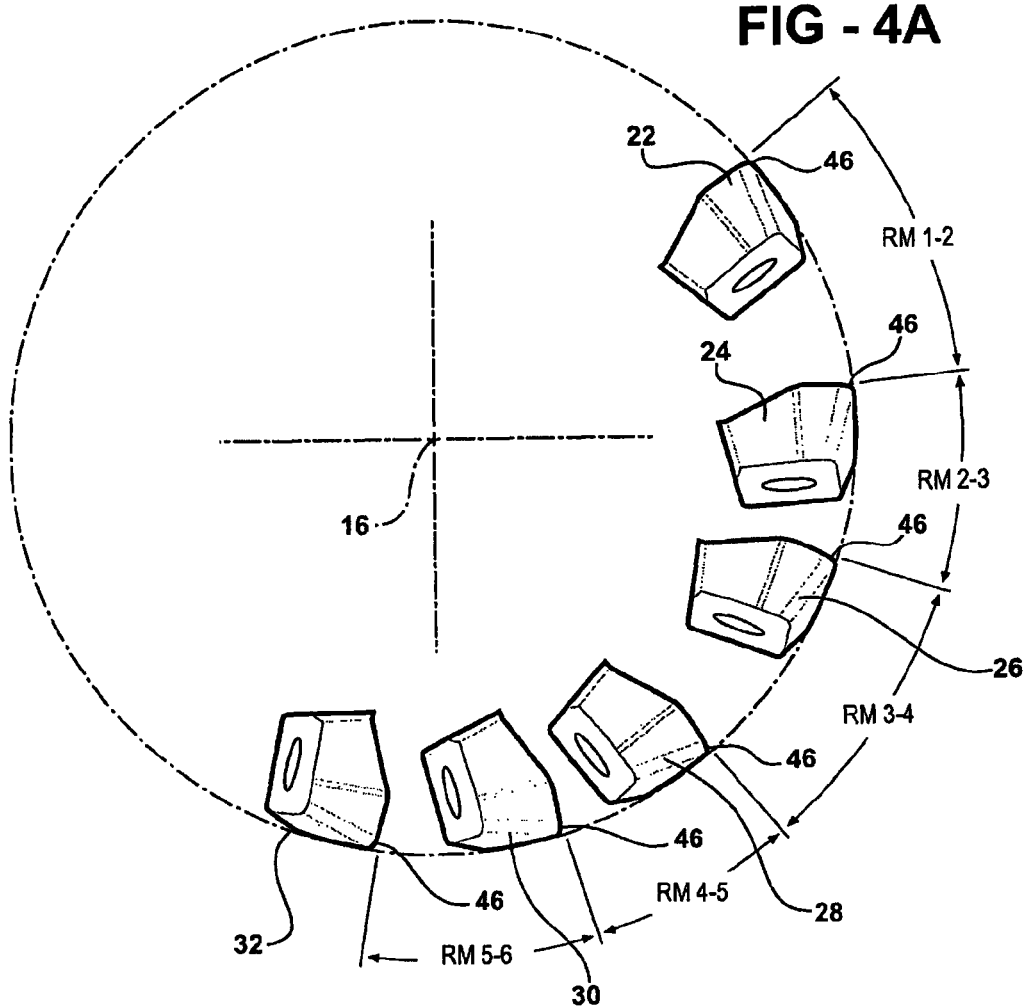
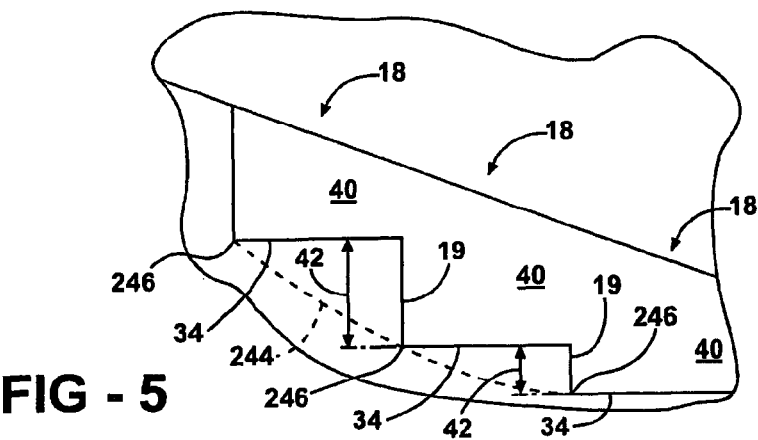

HELICAL MILLING CUTTER

FIELD OF THE INVENTION

The present invention relates to a helical milling cutter, more particularly to a helical milling cutter having helical arrays of cutting inserts removably attached to seats formed on the cutting tool.

BACKGROUND OF THE INVENTION

In the field of metal cutting, and more particularly metal cutting tool design, it is desirable to develop tools that obtain the most even distribution of cutting loads on a helical cutter during a cutting operation. Optimizing the cutting loads of a cutting tool allow the tool to work more quickly and efficiently. Additionally, it is desirable to optimize the cutting loads to prevent unwanted vibrations or chatter as the cutting tool moves against the work piece. Additionally, the unwanted vibrations can cause breakage of the cutting tool inserts or the body of the tool, which decreases the usable life of the cutting tool and its components and may ruin the work piece.

One such solution to improving cutting load is described in U.S. Pat. No. 5,083,887. In this solution, the cutting inserts are disposed in a helical array in which the cutting edge of each insert, with respect to the cutting tool, is spaced in a circumferential direction from the seat of the next adjacent insert and is in overlapping relationship in the axial direction with the cutting edge of the next adjacent insert, and the radially extending edges of each insert are in overlapping relationship with the radially extending edges of the adjacent inserts, such that the same point on all the cutting edges of all the inserts from the second row onward in any column comprise a continuous and non-interrupted layout line defining the helical array. The cutting tool described by this invention provides greater percentages of contact between the cutting tool and the work piece throughout the rotation of the tool; however, eliminating unwanted vibrations and improving cutting load is not achieved. In particular, the industry desires improved tools for even better surface finishing, smoother cutting action, reduced vibrations, reduced handling, reduced chattering, more economical cutters, more durable cutters, longer lasting cutters, and more simplistic designs for easier and faster manufacture and insert replacement.

SUMMARY OF THE INVENTION

The present invention relates to a cutting tool having an outer surface with a plurality of inserts connected to a distinct pocket extending generally radially on the outer surface. The cutting inserts are arranged in a helical array on the outer surface in a manner that at least one cutting edge of each cutting insert is spaced in an angular circumferential direction from the pocket of the adjacent cutting insert. The spacing of the inserts is such that a distinct point on the each one of the one or more cutting edges define part of a layout line having a non-uniform slope.

BRIEF DESCRIPTION OF THE DRAWINGS

Further features of the present invention, as well as the advantages derived therefrom, will become clear from the following detailed description made with reference to the drawings in which:

FIG. 4A is an end view of a cutting tool insert placement of a single column in accordance with one embodiment of the present invention;

FIG. 5 is an enlarged sectional side view of several cutting tool pockets with the cutting inserts removed.

DESCRIPTION OF THE PREFERRED EMBODIMENTS

Figure 2:
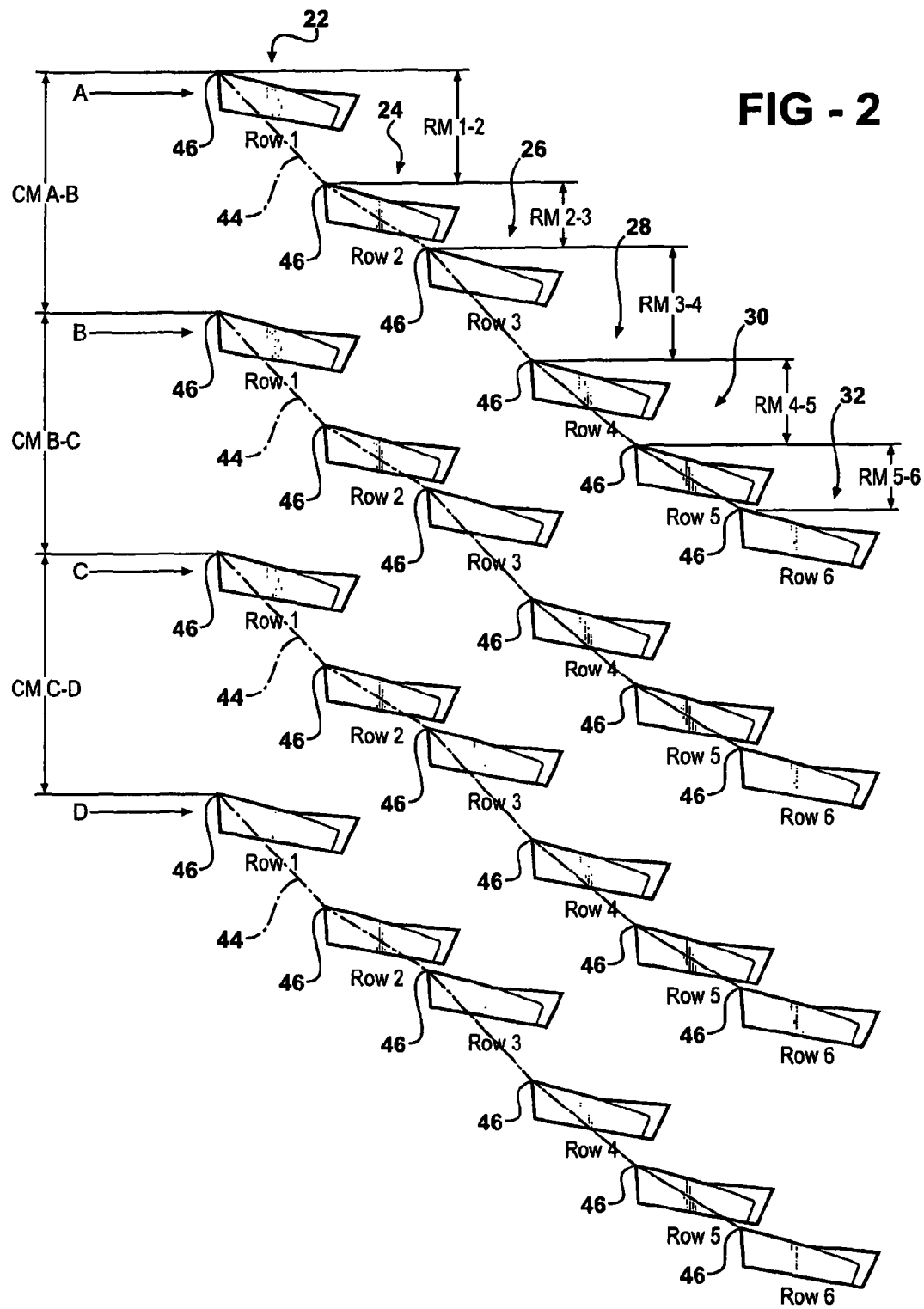
FIG. 2 is a projection of cutting inserts illustrating some of the features of the present invention.
Figure 3A:
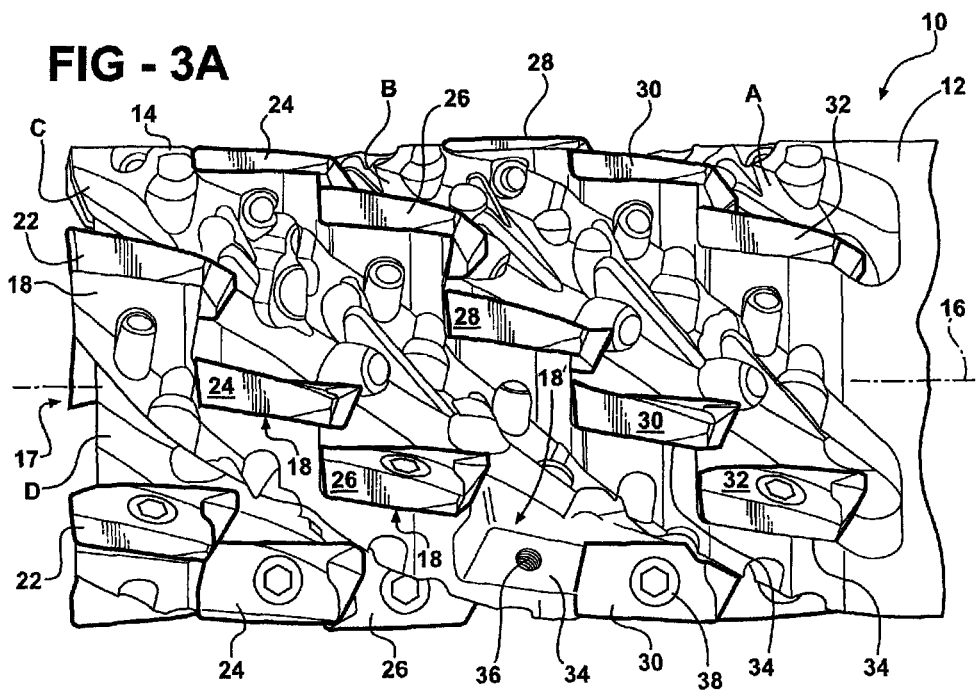
FIG. 3A is a perspective side view of a cutting tool in accordance with one embodiment of the present invention.

Referring now to FIGS. 2-5 generally and more specifically to FIG. 3A, a cutting tool 10 is shown. In a preferred embodiment, the cutting tool 10 is a helical milling cutter for use in a milling machine or machining center. Cutting tool 10 has a body 12 with an outer surface 14 that is generally cylindrically shaped and rotates about a rotational axis 16 during operation of the cutting tool 10 as well known in the art. Formed on the outer surface 14 are a number of columns A, B, C, D each having a plurality of cutting inserts 22, 24, 26, 28, 30, 32 connected to the outer surface 14 of the cutting tool 10. The columns A, B, C, D extend generally parallel to the rotational axis 16. The columns A, B, C, D include a chip gash or flute that is used for chip removal during a cutting operation. However, the presence or absence of a chip gash or flute is not necessary in order to have a column of inserts formed on the cutting tool 10, it will be appreciated that certain applications of the present invention benefit from or require a chip gash or flute for chip removal during the cutting process. Another factor in designing cutting tools is the number of columns of cutting inserts used. The cutting tool 10 depicted in FIGS. 2 and 3A has four columns A, B, C, D. However, it is within the scope of this invention to have a greater or lesser number of columns depending on the needs of a particular cutting tool design, e.g. insert size, milling cutter diameter, orientation of inserts, etc. It will be appreciated that the present invention can be applied to any cutting tool having a greater or lesser number of columns.

The cutting inserts are also arranged in rows that generally extend perpendicular to the rotational axis 16 and extend about the circumference of the cutter body 12. A first row of cutting inserts 22 is located at an axial cutting end 17 of the tool body 12. A second row of cutting inserts 24, third row of cutting inserts 26, fourth row of cutting inserts 28, fifth row of cutting inserts 30 and sixth row of cutting inserts 32, etc. are located generally adjacent each other in series along the axial length of the body 12. The cutting inserts 22, 24, 26, 28, 30, 32 are arranged in a helical array and are each connected to a distinct seat pocket 18 that is formed on and extends generally radial from the outer surface 14.

As shown in the drawings the number of inserts in each row is equivalent to the number of columns used in the cutting tool 10. However a lesser number of inserts can be used such that not every column has to have an insert in each row. The placement of the cutting inserts 22, 24, 26, 28, 30, 32 on the outer surface 14 of the cutting tool 10 has an effect on the performance characteristics of the cutting tool 10. In particular, the angular circumferential placement of the cutting inserts 22, 24, 26, 28, 30, 32 and/or pockets 18 along the columns A, B, C, D can affect the factors, such as but not limited to, cutting load, deflection, vibration and cutting edge wear or failure. Additionally, the angular circumferential distance between adjacent pockets 18 and/or cutting inserts within a row also effects factors such as, but not limited to, tool deflection, cutting load, vibration and cutting edge wear or failure.

Figure 1:
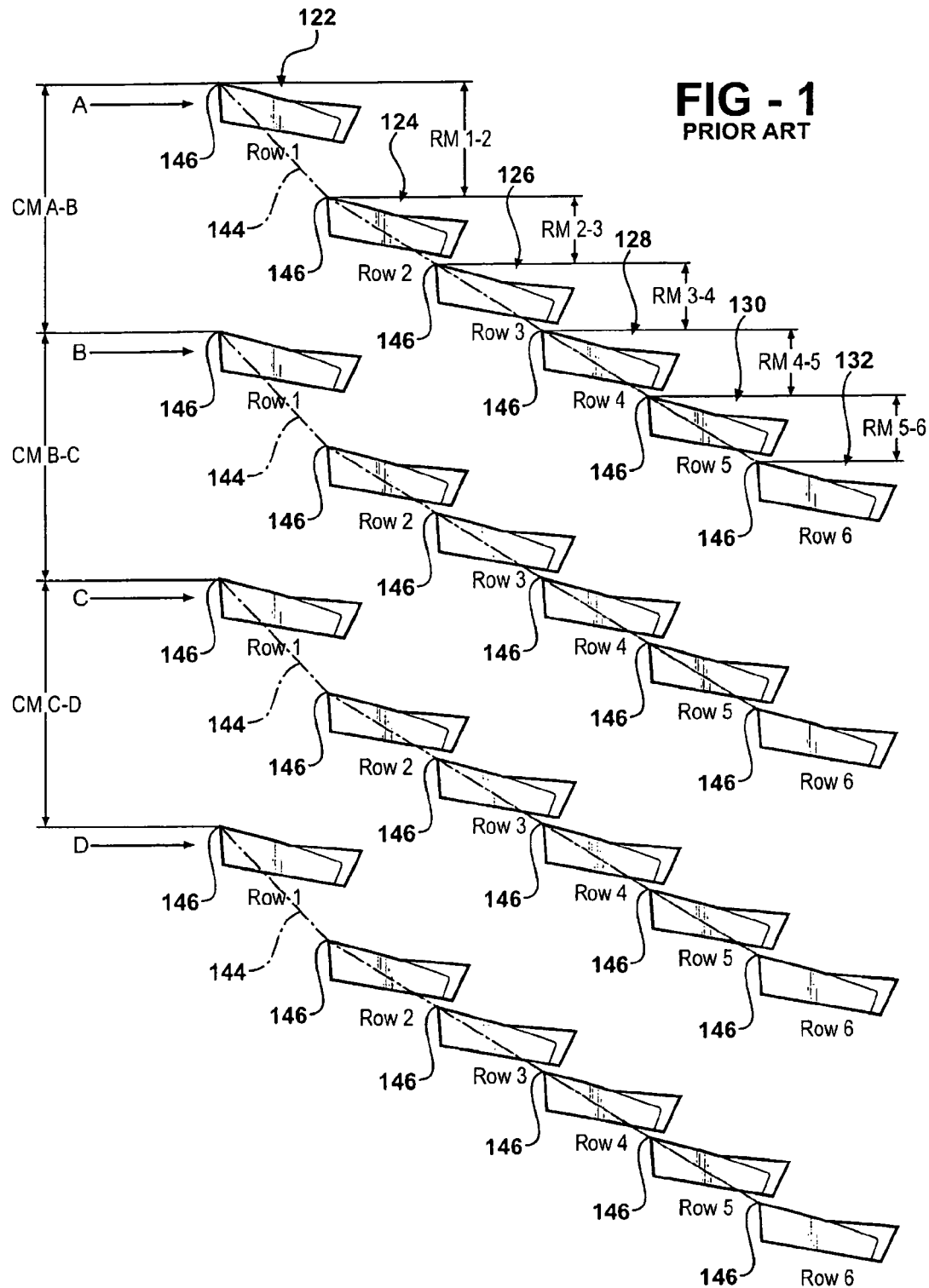
FIG. 1 is a projection of cutting inserts in a prior art helical cutting tool.

FIG. 1 represents a two dimensional schematic view of cutting insert placement on a prior art cutting tool. Like reference numerals differing by 100 are used to represent similar structures to that of the present invention. The cutting tool has four columns A, B, C, D each having a first row of cutting inserts 122, a second row of cutting inserts 124, third row of cutting inserts 126, fourth row of cutting inserts 128, fifth row of cutting inserts 130 and sixth row of cutting inserts 132 located generally adjacent each other in series from left to right across the page which in application to a cutting tool is along the axial length of the cutter tool body. The distance between distinct points on adjacent columns is what is referred to as a column measurement (CM), which is shown as equal between the columns A, B, C, D. Each column A, B, C, D has a layout line 144 defined as a continuous generally linear line drawn between the same distinct points 146 on each of the cutting inserts 122, 124, 126, 128, 130, 132. It will be appreciated that the layout line is an imaginary line formed by interconnecting the same point on each insert, (e.g., the same point on the cutting edge of each insert), or by interconnecting the same point on each pocket 18 of the cutter. As shown in the figures, the slope (e.g. angular circumferential placement of the cutting inserts) is uniform and linear from second, third, fourth, fifth and sixth cutting inserts 124, 126, 128, 130, 132. However, the slope between the first cutting insert 122 and second cutting insert 124 may vary from the other inserts in the column because of the placement of the first cutting insert 122 on the axial cutting end of the cutting tool body. The slope is derived from the row measurement (RM) or angular circumferential distance between rows in the same column.

FIG. 2 represents a two dimensional schematic view of cutting insert placement of the cutting tool 10 in accordance with one embodiment of the present invention. The distance between distinct points on adjacent columns is what is referred to as a column measurement (CM), which is shown as equal between the columns A, B, C, D. All of the cutting inserts 22, 24, 26, 28, 30 and 32 in a given row are equally spaced in an angular circumferential direction from adjacent cutting inserts in the same row. Each column A, B, C, D has a layout line 44 identical in shape to all other layout lines and each layout line 44 defines a generally continuous line drawn between the same distinct points 46 on the cutting edge of each of the cutting inserts 22, 24, 26, 28, 30, 32. As shown in FIG. 5, a layout line 244 can also be defined by the same distinct points 246 on the pockets 18 within the same column formed on the tool body 12. If cutting inserts of uniform size are used then the layout line 244 defined by points on the pockets 18 would generally be the same as the layout line 44 defined by distinct points 46 on the cutting edge of each of the cutting inserts 22, 24, 26, 28, 30, 32 in a column. Alternatively, if cutting inserts of non-uniform size are used then a layout line would be formed that is different than a layout line 244 formed using distinct points 246 on the pockets 18. All of the above mentioned variations are within the scope of this invention.

Figure 3B:
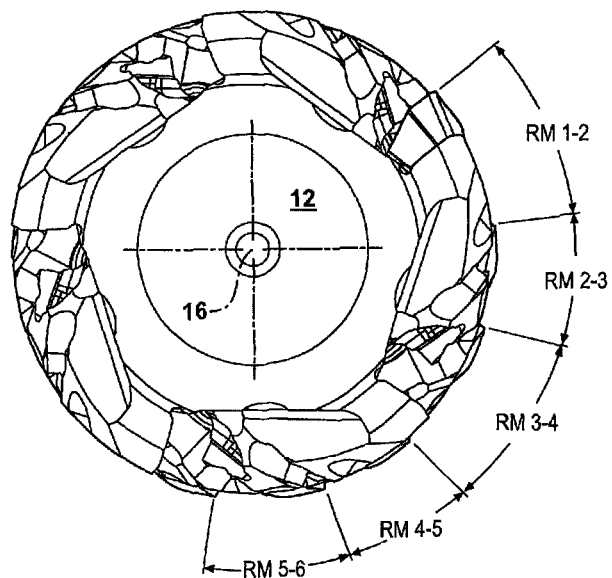
FIG. 3B is an end view of a cutting tool in accordance with one embodiment of the present invention.
Figure 4B:
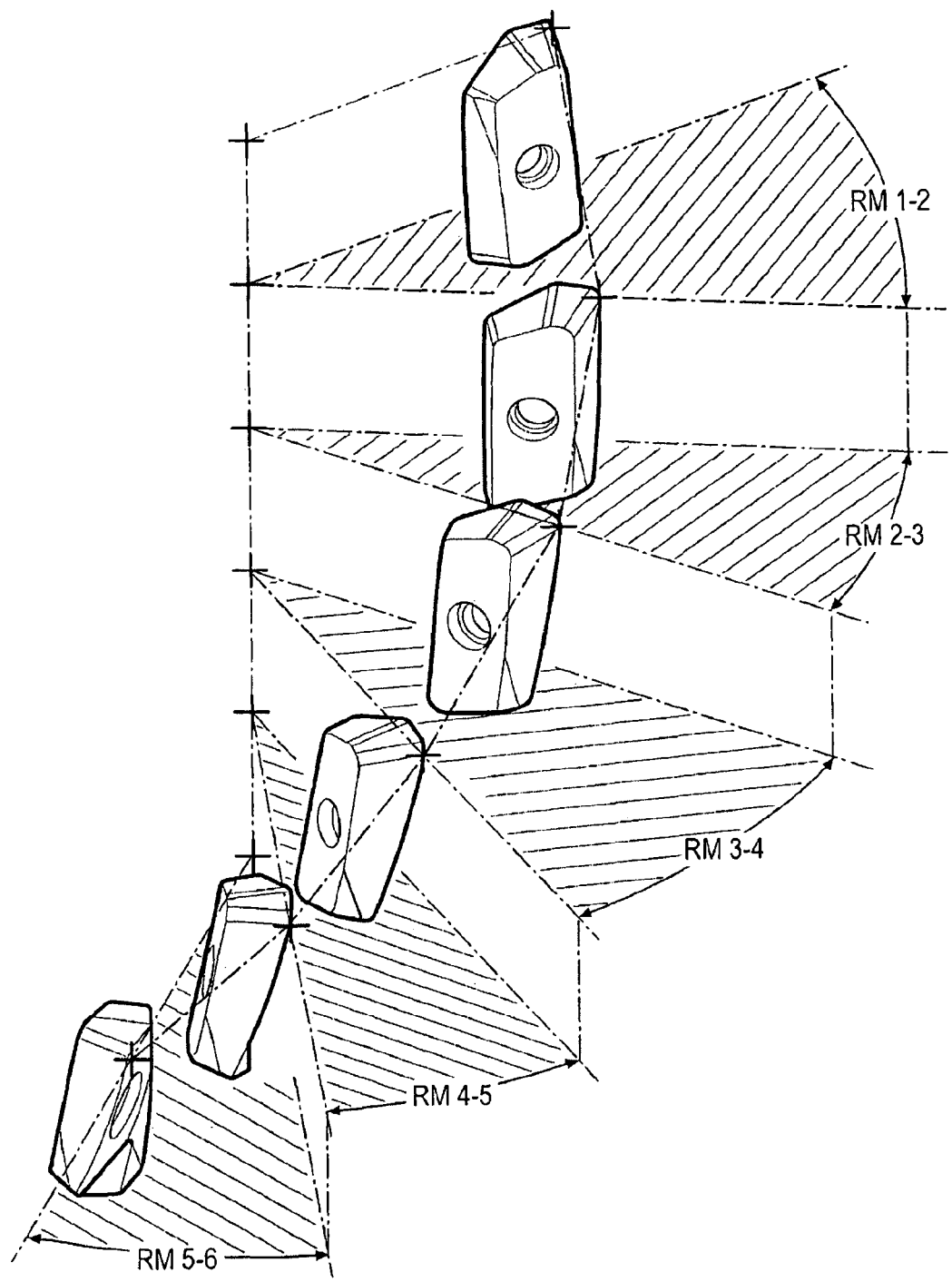
FIG. 4B is a side view of a cutting tool insert placement of a single column in accordance with one embodiment of the present invention.

Referring back to FIG. 2, the slope of the layout line 44 is derived from the row measurement (RM) or angular circumferential distance between rows in the same column. The RM measurement between the distinct points 46 of the inserts of each row 22, 24, 26, 28, 30, 32 is shown in FIG. 2. The slope (e.g. angular circumferential placement of the cutting inserts) of the layout line 44 of the present invention compared to the layout line 144 of the prior art is non-uniform and varies between at least two adjacent inserts within the same column. The variation in the layout line 44 maximizes the operation of the cutting tool by causing the cutting inserts 22, 24, 26, 28, 30, 32 of all the columns A, B, C, D to contact the work piece in a manner that minimizes one or more of vibration, tool deflection, cutting load, cutting edge wear and/or failure, etc. by minimizing the difference between minimum and maximum cutting forces as the cutter rotates during the cutting operation. Additionally, there is an improvement in cutting insert load efficiency, usable life is increased and instances of tool body and cutting insert failure are decreased. FIGS. 3B and 4A show the RM values between cutting inserts 22, 24, 26, 28, 30, 32 of a single column A, B, C, D. FIG. 4B is an end view of the cutting inserts 22, 24, 26, 28, 30, 32 of FIG. 4A with RM values shown in a three dimensional point of view. The RM value between adjacent inserts in a row is indicative of the angular circumferential distance between two adjacent row inserts in the same column A, B, C, D.

As indicated above, the slope of the layout line 44, when inserts of uniform size are used will depend on angular circumferential placement of the bearing face 34 of each pocket 18 along the column. This results in the layout line 44 being the same as the layout line 244. The position of the bearing face 34 can be controlled by varying a height 42 or distance between bearing faces 34 of adjacent rows within the same column as shown in FIG. 5, which is an enlarged two dimensional view of three pockets 18 in the same column A, B, C, D. Each pocket 18 has its respective cutting insert removed, however, the cutting inserts 22, 24, 26, 28, 30, 32 if present would be removably connected to a bearing face 34 of the pocket 18 using a suitable fastener as is well known in the art. Referring briefly to FIG. 3A, one of the pockets 18' has an insert removed and the bearing face 34 having a receiver aperture 36 can be seen. The receiver aperture 36 is configured to receive a fastener 38 that extends through the cutting inserts 22, 24, 26, 28, 30, 32 for removably connecting the cutting insert to the bearing face 34. Each pocket 18 also has a radial wall 40 and axial wall 19. A height 42 measurement is shown and is defined by the angular circumferential distance between adjacent bearing faces 34 in the same column. FIG. 5 depicts the height 42 as being two dimensional, however, it is actually a three dimensional measurement because in application the cutting tool body 12 is three dimensional with the pockets 18 being placed about the outer surface 14 of the tool body 12.

The angular circumferential placement of the cutting inserts 22, 24, 26, 28, 30, 32 between adjacent inserts in the same column or the same can be adjusted by changing the height 42 between adjacent pockets 18 such that the angular circumferential distance between cutting inserts 22, 24, 26, 28, 30, 32 is varied causing different RM measurement values between adjacent rows. This has the effect of creating a layout line 44 or layout line 244 (when cutting inserts of uniform size are used) having a varied slope compared to the layout line 144 in a prior art tool as illustrated in FIG. 1.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

While the invention has been specifically described in connection with certain specific embodiments thereof, it is to be understood that this is by way of illustration and not of limitation, and the scope of the appended claims should be construed as broadly as the prior art will permit.

What is claimed is:

1. A helical milling cutter comprising:
   an outer surface;
   a rotational axis about which the outer surface rotates;
   a first row having two or more inserts;
   a second row having two or more inserts, the second row being adjacent to the first row;
   a third row having two or more inserts, the third row being adjacent to the second row, wherein the first, second and third rows are arranged on the surface generally perpendicular and circumferentially about the rotational axis;
   two or more columns formed on the outer surface and extending across the first, second and third rows, wherein the two or more columns extend helically along at least part of and parallel to the rotational axis and are spaced apart on the outer surface, wherein the two or more inserts of the first, second and third rows in each of the two or more columns form one or more cutting edges along the rotational axis that define a layout line having a non-uniform varied slope beyond the first row and each layout line is identical in shape to all other layout lines.

2. The helical milling cutter of claim 1 further comprising two or more radially extending pockets each formed in a distinct one of the two or more columns, the two or more radially extending pockets define a connection point for a distinct one of the two or more cutting inserts in the first, second or third rows.

3. The helical milling cutter of claim 2 wherein each of the pockets has a bearing face upon which the distinct one of the two or more cutting inserts is connected and each one of the pockets has a height defined by an angular circumferential distance between adjacent bearing faces in the adjacent row of the distinct one of the two or more columns.

4. The helical milling cutter of claim 1 wherein the two or more cutting inserts of the first, second and third rows are spaced unequally in the angular circumferential direction from cutting inserts of the adjacent rows.

5. The helical milling cutter of claim 1 wherein all the two or more cutting inserts of the first, second and third rows are spaced equally in an angular circumferential direction from adjacent cutting inserts in the same row.

6. A helical milling cutter comprising:
   an outer surface;
   a rotational axis about which the outer surface rotates;
   three or more rows extending perpendicular to the rotational axis, wherein each of the three or more rows have two or more cutting inserts;
   two or more columns formed on the outer surface and each one of the two or more columns extending across the three or more rows, wherein the two or more columns extend helically along at least part of a parallel to the rotational axis and are spaced apart on the outer surface; and
   a layout line in each of the two or more columns, the layout line extending the length of one of the two or more columns and through a distinct point on a distinct one of each of the two or more cutting inserts in each row of the one of the two or more columns, wherein each layout line has a non-uniform varied slope beyond the first row and all of the layout lines are identical in shape to the layout lines in the other two or more columns.

7. The helical milling cutter of claim 6 further comprising at least two radially extending pockets each formed in a distinct one of the at least two columns, the at least two radially extending pockets define a connection point for a distinct one of the two or more cutting inserts in each of the three or more rows.

8. The helical milling cutter of claim 7, wherein each of the pockets has a bearing face upon which the distinct one of the two or more cutting inserts is connected and each one of the pockets has a height defined by an angular circumferential distance between adjacent bearing faces in the adjacent row of the two or more columns.

9. The helical milling cutter of claim 6 all of the two or more cutting inserts of the three or more rows are spaced equally in the angular circumferential direction from adjacent cutting inserts in the same row.

10. The helical milling cutter of claim 6 wherein the two or more cutting inserts of the at least two rows are spaced unequally in the angular circumferential direction from the cutting inserts of the adjacent rows.

* * * * *